2 Sheets. Sheet 1.
A. Whiteley.
Harvester Rake.
No. 304. Reissued April 3. 1855.
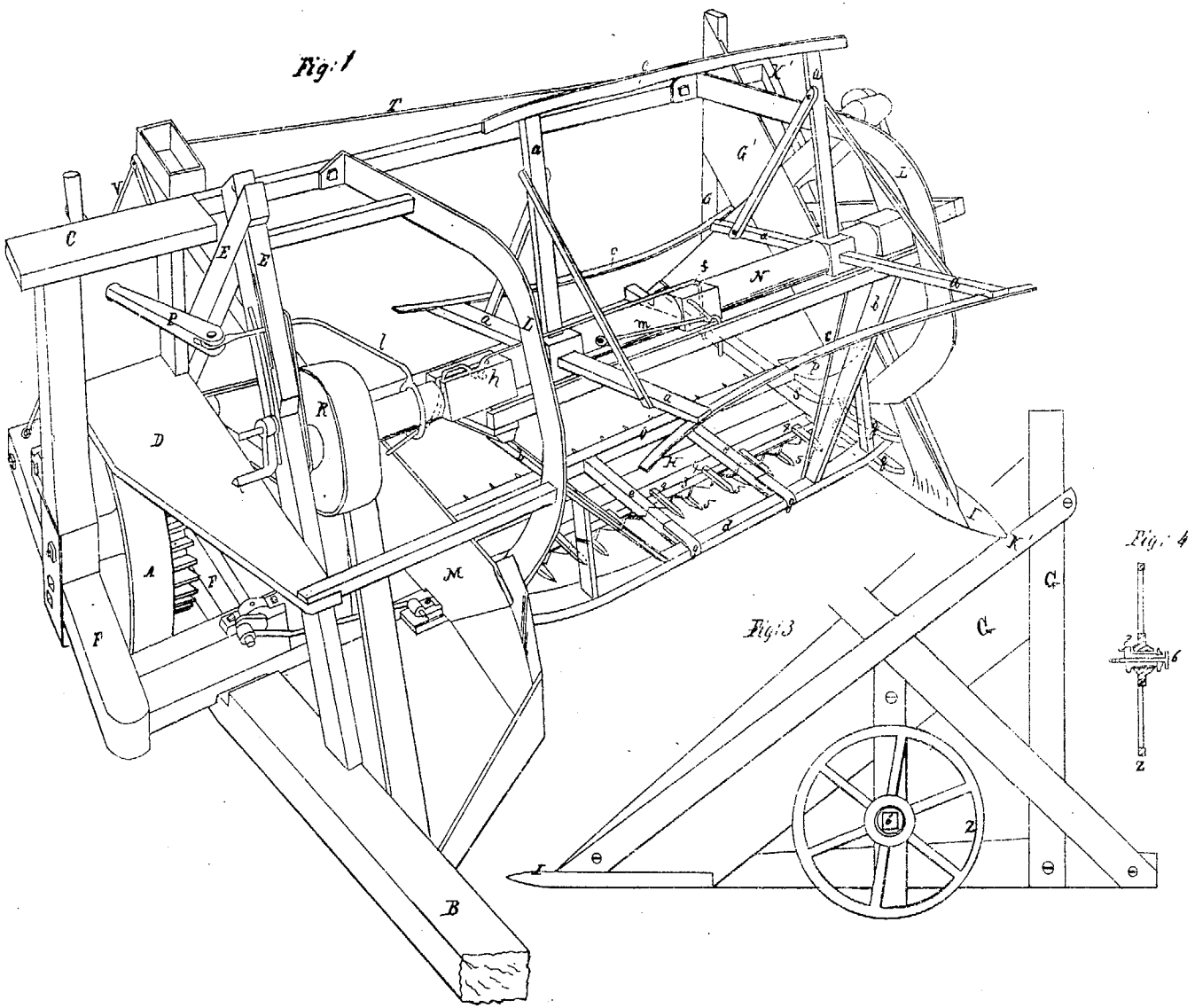

BEST AVAILABLE COPY
2 Sheets Sheet 2.
A. Whiteley,
Harvester Rake
BEST AVAILABLE COPY
No. 304
Reissued April 3, 1855
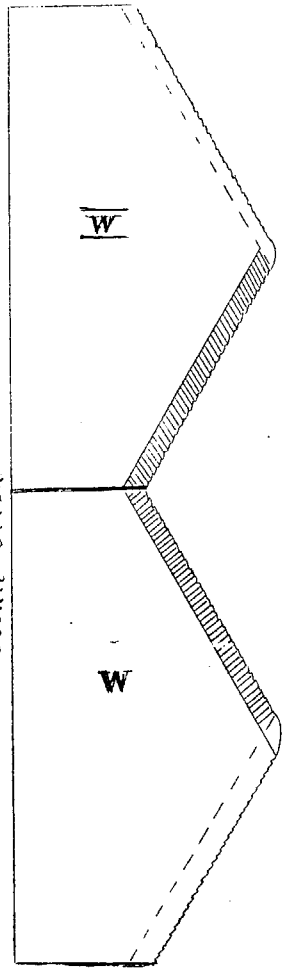
Scale 3 in.
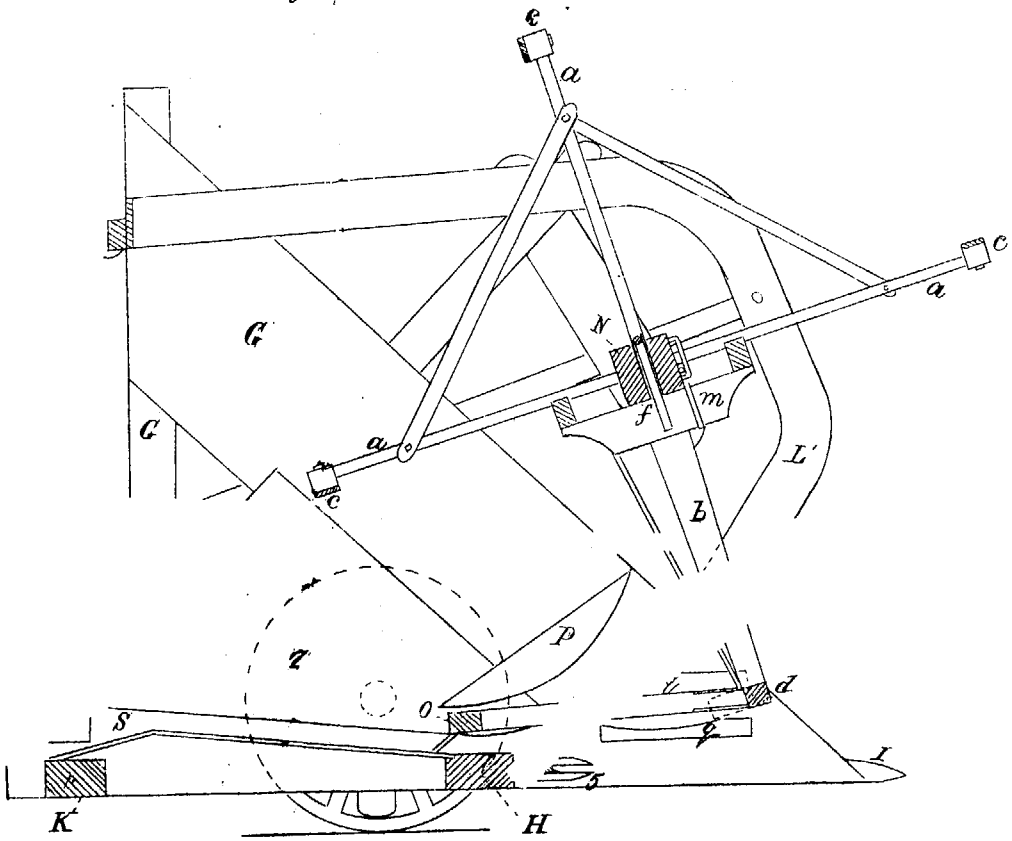

UNITED STATES PATENT OFFICE.

ABNER WHITELEY, OF SPRINGFIELD, OHIO.

IMPROVEMENT IN GRAIN AND GRASS HARVESTERS.

Specification forming part of Letters Patent No. 11,710, dated September 19, 1854; Reissue No. 301, dated April 3, 1855.

*To all whom it may concern:*

Be it known that I, ABNER WHITELEY, of Springfield, in the county of Clarke and State of Ohio, have invented a new and useful Improvement in Grain and Grass Harvesters; and I do hereby declare that the following is a full, clear, and exact description of the same, reference being had to the accompanying drawings, making part of this specification.

This improvement embraces an automatic raker or deliverer of the cut grain received on the platform of the reaper, and several important improvements of the reaper itself, such as the improvement in guiding the grain (when being reeled down onto the platform) into the end of the reel, so as to incline the grain sufficiently into the reel for the reel to take hold of that part of the grain which comes in front of the divider and reel it down onto the platform; also, in placing the fingers (unprovided with slots) on alternate sides of the cutter blades and bar, the edges of which are also alternating.

In the accompanying drawings, of which Figure 1 is a perspective view with the extra platform detached, A is the master-wheel; B, the tongue, (the extended end removed;) C, the driver's seat, and D his foot rest; E E, an angular frame rising from the tongue and main frame F F. G G′ is an angular frame; and between these two is placed the finger-bar H and platform for receiving the grain. I is the nose or grain-divider. Behind H will be noticed a parallel brace, K, whose object or use will be hereinafter explained. L L′ are rake-guides, in the inside of which the ends of the rake are guided; and it will be observed that the outward one, L′, is not confined to G′ at its lower end, said lower end being part of the nose, while the other one is secured to the side of the platform M. This arrangement of L′ is necessary to permit the grain to pass between the brace G′ and guide.

N is the reel-shaft; *a a a*, the three sets of arms thereof, and *b b* the remaining pair, constructed so as to admit the rake to swing between them at their insertion in the shaft N. *c c c* are blades on the arms *a a a*. *d* unites the fourth set and forms a suspending-point for the rake. *g g* are loose-fitting straps hinging the blade *d* to the bars *c c*, and the bars *c c* are framed into the rake O. These several arms are suitably braced. *f* is a lever-latch passing through shaft N, being pivoted at *h*, and retained in its locked condition by the loop *l* when the knee-lever P is moved toward the right by the driver. *m* is another self-dropping latch, by means whereof the rake-head O is retained between it and *f* when locked. R is a pulley receiving motion by a band on a pulley on the driving-pinion shaft. The reel admits of adjustment of height to suit the grain.

P represents one of the two upper guides for the rake O, leaving a space between it and S—one of the ways on the platform. *q q* are guides between which the ends of the reel rods or blades pass when the reel revolves, and serve to incline the grain into the end of the reel, so as to be caught by the blades and carried onto the platform—*i. e.*, the grain in front of the divider.

T is a metal rod connecting the extended rear end of M with the upper end of K′, and V a second rod continuing the connection to the main frame F. It is by this arrangement that any weight received on the nose I is transferred to M, and thence transferred to the end of the tongue B.

The cutting part is designated by figures or numbers. 3 is the slide-bar on which the cutters are secured; 4 4 4, a series of plain-faced fingers—that is, without guard or under piece or slot. 5 5 5 are alternate fingers placed with their faces upward, being the reverse of 4 4 4. Between these sets the cutter-blades work, and to meet the requirement of alternate fingers the edges of the cutters also alternate—that is, every tooth has its edges alternate, the one shearing against the upper finger during one stroke of the crank and the other shearing against the under finger adjacent to it during the other stroke of the crank. Said teeth are made rights and lefts, so as to place them alternately on the cutter-bar, and the two adjacent edges which cut against any one of the fingers will be beveled the same way, so as to cut with a close shear-edge against both sides of every finger, and it is by this arrangement I obviate all difficulty of choking; and by the cutters being sprung in opposite directions it will be seen that the spring of the one will balance the spring of the other and always leave the bar loose in the fingers, thus avoiding all binding in the fingers when the cutters become dull, and preserving the line of cut.

The operation of the rake is as follows: Being hung on one of the rods or blades, it is brought into play, (when not locked by the bolt,) and on the revolution of the reel it drops by the weight of the rake-head O, the ends of which falling in the guides or ways L L′, and enters the grooved guides near the platform, where it takes the butt of the grain previously laid by the reel and travels across the platform on the extended ends of the ways, delivering the grain by pushing it before the rake-head, either over the rear of the platform or onto a second platform with a side delivery. The rake-head, on its leaving the grain, by a receding movement rising, the reel is ready for another stroke of the rake, as in the first. The object of the extended upper portion of the guides L L′ is to retain the rake-head therein during its passage over the reel-shaft, the front portion of said guides L L′ serving to guide the rake thence down to the platform, the extended ends S S serving to make its passage over the platform more easy. The manner of locking the rake-head in light grain, so as to allow a number of revolutions of the reel to intervene between each action of the rake and accumulate a bundle on the platform, is by the knee of the driver operating the lever-latch on the one side, while the drop-latch secures the opposite side of the rake-head. When the lock is not used the rake freely operates on each revolution of the shaft N, the guides *q q* and the upper one, which is not marked in the drawings, all extending into the end of the circuit of the reel rods or blades when the reel is working at its lowest point. Consequently the grain is forced into the end of the reel as the machine is drawn forward, the slanting front ends of said guides pressing the grain gradually into it, and each reel-rod is compelled to carry to the platform the grain which comes in between it and the rod preceding it, and thus prevent the grain accumulating on the divider as it is being cut, and also prevent the same mashing down the grain in front of the divider and running over it, as it will when the grain is allowed to accumulate on the divider, and as the reel is raised to the higher points, the upper guides still performing the same office. W *w* are two of the sickle-teeth, W being a right and *w* being a left. The action of the cutters or knives will be understood to be reciprocating by motion from crank, &c.

In Figs. 2, 3, and 4 the grain-wheel Z is shown. It is secured at any desired height of stubble to the side of the machine by a single bolt passing through a short arm or axle, 7, said arm provided with a small stud to prevent its turning, while the wheel Z turns freely on the arm. By the mere turning of the bolt 6 the wheel is released from the platform, changed to a new height, and again fastened without risk or danger consequent of other modes of attaching this wheel to the reaper.

Having described my improvements, what I claim as my invention, and desire to secure by Letters Patent, is—

1. The combination of the rake O, swinging or suspended from one rod of the reel, with the guides L L and ways S S, substantially as above set forth and described, for the purpose not only of delivering the grain at the rear of the platform, but also for better directing the standing crop to the cutters. I do not claim any rotary sweep-rake carried on arms in the shaft which drives it and sliding on these arms to and from said shaft, permitting it to be adjusted to the platform by guides for that purpose, nor any such guides, whether combined with the reel or not; neither do I claim any such guides as are used for reciprocating rakes.

2. The guides for forcing the grain into the end of the reel, as described, and for the purposes set forth. I do not claim any guides for guiding the grain into the reel when they are placed below the lowest point at which the reel-rods work.

3. The latch *f* and appendages, by which the operator is enabled to permit more or less grain to accumulate on the platform between successive actions of the rake.

4. Placing the vibrating knife-bar 3 and cutters thereon between alternately-placed fingers 4 and 5, for the purpose of dispensing with the slot-guards, and sustaining the line of cut by throwing the action of the alternate shear-edge of the blades of said cutters on the upper and lower sides of the said fingers.

5. I do not claim the mere alternation of the teeth on the cutter-bar, so that the two edges of one tooth will be above and those of the next below; but I do claim the alternate edging of the same tooth, and so placing them together that the two adjacent edges of successive teeth which act against the same finger may be alike turned in one direction, while the next two edges, acting against the next finger, are alike turned in the contrary direction.

ABNER WHITELEY.

Witnesses:
JOHN L. SMITH,
R. B. HUGHES.